United States Patent
Sugahara

(10) Patent No.: US 7,733,549 B2
(45) Date of Patent: Jun. 8, 2010

(54) ACTUATORS, PUMPS, AND OPTICAL SCANNERS

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 448 days.

(21) Appl. No.: 11/864,008

(22) Filed: Sep. 28, 2007

(65) Prior Publication Data

US 2008/0080035 A1 Apr. 3, 2008

(30) Foreign Application Priority Data

Sep. 29, 2006 (JP) ............... 2006-266900

(51) Int. Cl.
*G02B 26/08* (2006.01)
(52) U.S. Cl. .................. 359/223.1
(58) Field of Classification Search ... 359/223.1–226.1, 359/290, 291, 871, 872
See application file for complete search history.

(56) References Cited

U.S. PATENT DOCUMENTS 6,565,727 B1 5/2003 Shenderov

| | | | |
|---|---|---|---|
| 6,989,234 B2 * | 1/2006 | Kolar et al. | 435/6 |
| 2002/0114715 A1 | 8/2002 | Yoon et al. | |
| 2005/0123243 A1 * | 6/2005 | Steckl et al. | 385/141 |

FOREIGN PATENT DOCUMENTS

FR 2889514 A1 2/2007
JP 2005-185090 A 7/2005

OTHER PUBLICATIONS

European Patent Office, European Search Report for Related EP Application No. 07019079 dated Apr. 4, 2008.

* cited by examiner

*Primary Examiner*—Euncha P Cherry
(74) *Attorney, Agent, or Firm*—Baker Botts, LLP.

(57) ABSTRACT

An actuator includes a substrate including an insulating surface, a first electrode positioned on the insulating surface, and a flexible drive plate which opposes the insulating surface. Te actuator also includes a conductive liquid positioned between the insulating surface and the flexible drive plate, and the conductive liquid directly or indirectly contacts the insulating surface and the flexible drive surface. Moreover, the actuator includes a potential application device electrically coupled to the first electrode and configured to apply a potential to the first electrode.

23 Claims, 13 Drawing Sheets

ACTUATORS, PUMPS, AND OPTICAL SCANNERS

CROSS REFERENCE TO RELATED APPLICATION

The present application claims priority from Japanese Patent Application No. 2006-266900, which was filed on Sep. 29, 2006, the disclosure of which is herein incorporated by reference in its entirety.

BACKGROUND OF THE INVENTION

1. Field of the Invention

The present invention relates generally to actuators configured to drive or to actuate a device using electrowetting, and pumps and optical scanners comprising such an actuator.

2. Description of Related Art

Electrowetting is a known phenomenon in which when a potential difference is applied between an electrode covered by an insulating layer and a liquid droplet positioned on a surface of the insulating layer, a wetting or contact angle of the droplet with respect to the surface of the insulating layer is altered due to changes in interfacial tension between the droplet and the surface of the insulating layer. Recently, principles associated with these changes in liquid droplet behavior based on electrowetting have been applied to actuators. Specifically, the driving power of actuators employing electrowetting more readily may be saved than the driving power of actuators employing motors and piezoelectric actuators. Moreover, actuators employing electrowetting may have a less complex structure than actuators employing motors and piezoelectric actuators, which may decrease the size of the actuator.

A known device employing electrowetting, such as the device described in Japanese Laid-open Patent Publication No. 2005-185090, applies electrowetting to a drive device (actuator) which is driven when a focus of a camera lens is adjusted. The known device includes a first body and a second body which opposes the first body, such that the second body selectively mores closer to and further away from the first body, and a liquid droplet positioned between the first body and the second body, such that the liquid droplet contacts the first body and the second body. The wetting angle of the liquid with respect to a surface of the body which the droplet contacts is altered by electrowetting. Thus, the height of the droplet between the first body and the second body is altered to adjust the distance between the first body and the second structure body.

The drive device drives the first body and the second body, such that they selectively move closer to and further away from each other. Nevertheless, such a drive device may not always be suitable for subtle adjustments of drive amounts.

SUMMARY OF THE INVENTION

Therefore, a need has arisen for actuators, pumps, and optical scanners which overcome these and other shortcomings of the related art. A technical advantage of the present invention is that an actuator may actuate or drive a device based on electrowetting by deforming a drive plate to achieve reduction of power consumption and size of the actuator.

According to an embodiment of the present invention, an actuator comprises a substrate comprising an insulating surface, a first electrode positioned on the insulating surface, and a flexible drive plate which opposes the insulating surface. The actuator also comprises a conductive liquid positioned between the insulating surface and the flexible drive plate, and the conductive liquid directly or indirectly contacts the insulating surface and the flexible drive surface. Moreover, the actuator comprises a potential application device electrically coupled to the first electrode and configured to apply a potential to the first electrode.

According to another embodiment of the present invention, a pump comprises a fluid chamber configured to store fluid therein, and a pump body having an inlet and an outlet formed therethrough. Each of the inlet and the outlet are configured to be in fluid communication with the fluid chamber. The pump also comprises an actuator configured to alter a volumetric capacity of the fluid chamber. The actuator comprises a substrate comprising an insulating surface, a first electrode positioned on the insulating surface, and a flexible drive plate which opposes the insulating surface. The actuator also comprises a conductive liquid positioned between the insulating surface and the flexible drive plate, and the conductive liquid directly or indirectly contacts the insulating surface and the flexible drive surface. Moreover, the actuator comprises a potential application device electrically coupled to the first electrode and configured to apply a potential to the first electrode.

According to yet another embodiment of the present invention, an optical scanner comprises a light reflecting portion, and an actuator configured to alter an inclination angle of the light reflecting portion. The actuator comprises a substrate comprising an insulating surface, a first electrode positioned on the insulating surface, and a flexible drive plate which opposes the insulating surface. The actuator also comprises a conductive liquid positioned between the insulating surface and the flexible drive plate, and the conductive liquid directly or indirectly contacts the insulating surface and the flexible drive surface. Moreover, the actuator comprises a potential application device electrically coupled to the first electrode and configured to apply a potential to the first electrode.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Embodiments of the present invention and their features and technical advantages may be understood by referring to FIGS. 1-13A, like numerals being used for like corresponding portions in the various drawings.

Figure 1:
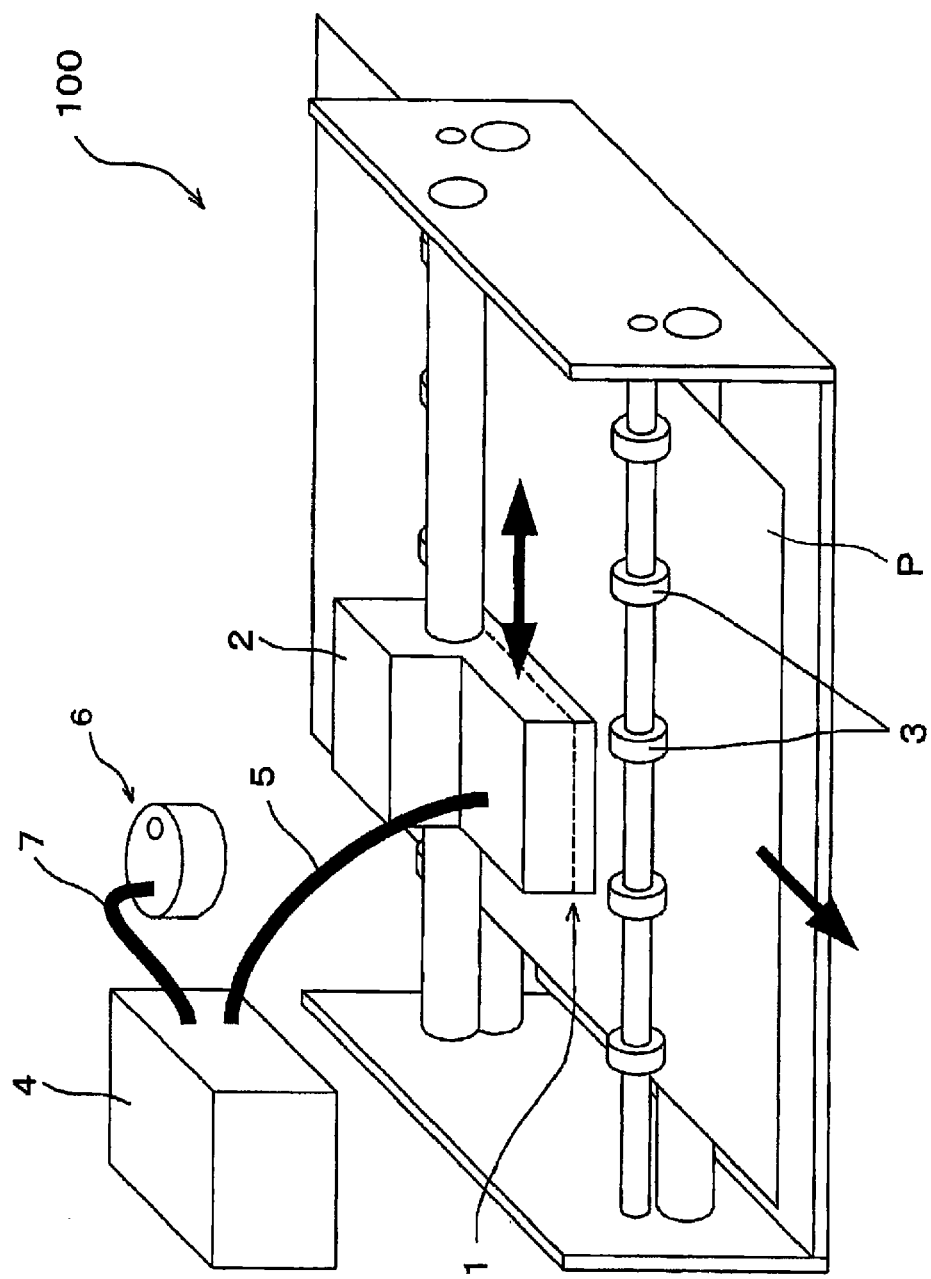
FIG. 1 is a schematic diagram of an inkjet printer, according to an illustrative embodiment of the present invention.

Referring to FIG. 1, an inkjet printer 100 according to an embodiment of the present invention is depicted. Inkjet printer 1 may comprise a pump 6, e.g., an air pump, and a carriage 2 configured to reciprocate in a scanning direction. Inkjet printer 1 also may comprise a print head 1, e.g., a serial print head, which is mounted on carriage 2 and is configured to eject ink onto a recording sheet P, and a feed roller 3 configured to feed recording sheet P in a sheet feeding direction indicated by a frontward pointing arrow in FIG. 1.

Print head 1 may be connected to an ink cartridge 4 configured to store ink therein, via a tube 5. Ink cartridge 4 may be positioned above print head 1. Ink may be supplied from ink cartridge 4 to print head 1. Print head 1 moves together with carriage 2 in the scanning direction to form an image on sheet P by ejecting ink from nozzles positioned on a lower side of print head 1. Sheet P having an image formed thereon is fed by feed roller 3 in the sheet feeding direction to discharge sheet P from inkjet printer 100.

Pump 6 may be connected to an air intake portion of ink cartridge 4 via a tube 7. Pump 6 may be used to adjust an inner pressure in ink cartridge 4 to be less than an atmospheric pressure when inkjet printer 100 is not ejecting ink from the nozzles of print head 1, such that ink may not leak from the nozzles due to the height difference between print head 1 and ink cartridge 4.

Referring to FIGS. 2-6, pump 6 may have an air chamber 14 defined therein, and may comprise a pump body 10 having an inlet 15 and an outlet 16 which are configured to be in fluid communication with air chamber 14, and an actuator 11 configured to selectively alter the volumetric capacity of air chamber 14.

Pump body 10 may comprise a circular bottom plate 12 and a bottomed cylindrical case member 13 attached to an upper surface of bottom plate 12. Case member 13 encloses a space above bottom plate 12. Bottom plate 12 and an interior of case member 13 define air chamber 14 therein. An upper wall of case member 13 has inlet 15 and outlet 16 passing therethrough. Tube 7 is connected to inlet 15, and air chamber 14 is configured to be in fluid communication with an interior space of ink cartridge 4, in which ink is stored, via tube 7.

Outlet 16 opens to the outside, and air chamber 14 is configured to be in fluid communication with the air via outlet 16.

Bottom plate 12 and case member 13 may comprise a synthetic resin material, such as polyimide, silicone, and/or metal. A plurality of drive electrodes 20 may be positioned on an upper surface of bottom plate 12, and at least upper surface of bottom plate 12 may comprise an insulating surface configured to insulate drive electrodes 20. When bottom plate 12 is entirely formed of an insulating material, special surface treatment may not be necessary. Nevertheless, if bottom plate 12 is not formed of an insulating material, it may be desirable to treat the upper surface of bottom plate 12 to have an insulation property. For example, when bottom plate 12 comprises silicone, a silicone oxide film may be formed on the upper surface of bottom plate 12. When bottom plate 12 comprises metal, a thin film comprising an insulating material may be formed on the upper surface of bottom plate 12.

An inlet valve member 17 may be positioned on the upper wall of case member 13 near inlet 15, and may be configured to move in the vertical direction. Inlet valve member 17 is configured to selectively open and close inlet 15 based on changes in the pressure in air chamber 14. When inlet valve member 17 contacts a valve seat 13a positioned at a lower surface of the upper wall of case member 13, inlet valve member 17 closes inlet 15 from an inner side of case member 13. Inlet valve member 17 may be biased upward in the direction to close inlet 15 by an urging member (not shown).

An outlet valve member 18 may positioned on the upper wall of case member 13 near outlet 16, and may be configured to move in the vertical direction. Outlet valve member 18 is configured to selectively open and close outlet 16 based on changes in the pressure in air chamber 14. When outlet valve member 18 contacts a valve seat 13b positioned at an upper surface of the upper wall of case member 13, outlet valve member 17 closes outlet 16 from an outer side of case member 13. Outlet valve member 18 may be biased downward in the direction to close outlet 16 by an urging member (not shown).

When the volumetric capacity of air chamber 14 increases by the activation of actuator 11, and the inner pressure in air chamber 14 decreases, inlet valve member 17 moves downward away from valve seat 13a against an urging force of the urging member due to pressure difference between air chamber 14 and ink cartridge, such that inlet 15 opens. When the volumetric capacity of air chamber 14 decreases and the inner pressure in air chamber 14 increases, outlet valve member 18 moves upward away from valve seat 13b against an urging force of the urging member due to pressure difference between air chamber 14 and the air, such that outlet 16 opens.

Actuator 11 may comprise bottom plate 12 of pump body 10 as a substrate, a plurality of drive electrodes 20 positioned on the upper surface of bottom plate 12, an insulating layer 21 positioned on the upper surface of bottom plate 12 so as to cover drive electrodes 20, a drive plate 22 positioned at a distance from insulating layer 21, conductive liquid droplets 23 positioned between insulating layer 21 and drive plate 22, and a driver IC 24 configured to apply potential to drive electrodes 20.

Figure 3:
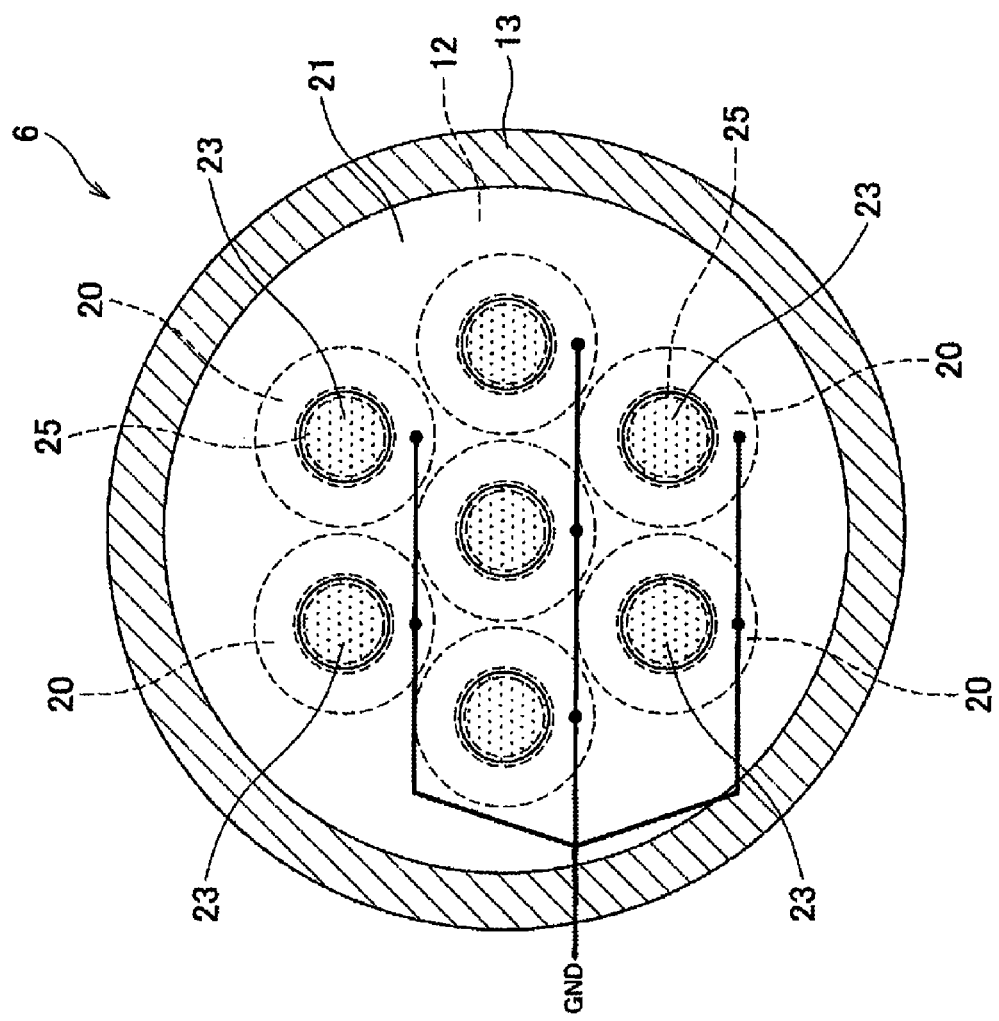
FIG. 3 is a horizontal, sectional view of the pump of FIG. 2, taking along a line A-A.

As shown in FIG. 3, each drive electrode 20 may have a seamless circular shape. Drive electrodes 20 may be positioned on the upper surface of bottom plate 12, such that the distance between centers of adjacent drive electrodes 20 is substantially the same. For example, six drive electrodes 20 may be positioned around one drive electrode 20, nevertheless, those of ordinary skill in the art readily will understand that any number of drive electrodes 20 may be used. Drive electrodes 20 may be provided on the upper surface of bottom plate 12 by screen printing or sputtering.

Drive electrodes 20 may be connected to driver IC 24, and either drive potential or ground potential may be applied to drive electrodes 20 by driver IC 24. Insulating layer 21 covers the upper surface of bottom plate 12 except for a circular area 25 positioned inside drive electrode 20. The upper surface of bottom plate 12 is exposed from circular areas 25. Wetting angle θ of liquid droplet 23 contacting insulating layer 21, with respect to a surface of insulating layer 21, may be greater than wetting angle θ of droplet 23 contacting the upper surface of the bottom plate 12, with respect to the upper surface of bottom plate 12, e.g., insulating layer 21 may be more lyophobic and may have a greater liquid repellency than circular area 25.

When a drive potential is applied to drive electrodes 20 by driver IC 24, wetting angle θ of droplet 23 with respect to an area of insulating layer 21 corresponding to drive electrodes 20 decreases due to electrowetting. At this time, liquid repellency of insulating layer 21 decreases to substantially the same level as that of the upper surface of bottom plate 12.

Insulating layer 21 may comprise a synthetic resin material comprising fluorine-based resin, such as PTFE (polytetrafluoroethylene). Insulating layer 21 may be a thin layer having greater liquid repellency than the upper surface of bottom plate 12. Insulating layer 21 may be formed by applying a thin film of synthetic resin material entirely to the upper surface of bottom plate 12 by, for example, by spin-coating and then removing the thin film from areas inside drive electrodes 20 by laser processing.

Drive plate 22 may have a disc shape having substantially the same area as bottom plate 12. Drive plate 22 may comprise a synthetic resin material, such as polyimide. A lower surface of drive plate 22 faces insulating layer 21 formed on the upper surface of bottom plate 12. The periphery of drive plate 22 may fixed to a peripheral wall of case member 13. The lower end of air chamber 14 in pump body 10 may be defined by the upper surface of drive plate 22. Drive plate 22 may have a common electrode 26 positioned substantially entirely on the lower surface of drive plate 22 facing the upper surface of bottom plate 12. Common electrode 26 may be connected to driver IC 24, and may be maintained at the ground potential.

Conductive droplets 23 may be positioned in positions corresponding to drive electrodes 20. Droplets 23 may contact the lower surface of drive plate 22 and the insulating surface of bottom plate 12, and may be positioned between bottom plate 12 and drive plate 22. Droplets 23 may maintain contact with common electrode 26, such that droplets 23 may be maintained at the ground potential via common electrode 26.

Conductive droplets 23 may comprise water, water-glycerol-salt mixtures, or ionic liquid (ambient temperature molten salt) that contains essentially only ions. Ionic liquid is generally nonvolatile and may not be readily vaporized even when it is exposed to the air for a substantial amount of time.

Circular areas 25 inside drive electrodes 20 may not be covered by insulating layer 21, and the upper surface bottom plate 21 may exposed from circular areas 25. Wetting angle θ of droplet 23 with respect to circular area 25 may be less than that with respect to surrounding insulating layer 21. By the potential difference between drive electrodes 20 and droplets 23 caused by the application of drive potential to drive electrodes 20, liquid repellency of insulating layer 21 covering drive electrodes 20 is reduced, such that wetting angle θ of droplet 23 with respect to an area of insulating layer 21 corresponding to drive electrode 20 becomes substantially the same as wetting angle θ of droplet 23 with respect to circular area 25.

Wetting angle θ of droplet 23 with respect to circular area 25 may be less than or equal to wetting angle θ of droplet 23 with respect to an area of insulating layer 21 corresponding to drive electrode 20, regardless of whether the drive potential is applied to drive electrode 20. Circular area 25 may be a lyophilic area where droplet 23 can rest stably, such that droplets 23 may rest at corresponding circular areas 25 inside drive electrodes 20.

Driver IC 24 applies either drive potential or ground potential to drive electrodes 20 based on a control signal input from controller 8 of inkjet printer 100 when controller 8 determines that pump 6 needs to be driven. Changes in the potential applied to drive electrodes 20 alter wetting angle θ of droplets 23 with respect to insulating layer 21, such that the height of droplets 23 may be altered. Driver IC 24 may maintain common electrode 26 at ground potential.

Symbol "+" in the drawings represents that drive potential is applied to drive electrodes 20, and the letters "GND" in the drawings represents that drive electrodes 20 are maintained at ground potential.

When driver IC 24 applies a drive potential, which is different than ground potential, to drive electrodes 20, a potential difference is applied between droplets 23, and interfacial tension between droplet 23 and insulating layer 21 is altered based on the potential difference. As the potential difference increases, wetting angle θ of droplet 23 with respect to insulating layer 21 decreases due to electrowetting.

By switching the potential applied to drive electrodes 20 between two different potentials, e.g., between the drive potential and ground potential, the liquid repellency of a surface of insulating layer 21, i.e., wetting angle θ of droplets 23, readily may be altered. One of the two different potentials applied to drive electrodes 20 by driver IC 24 may be ground potential, such that a single power supply may be employed. Thus, the structure of driver IC 24 may be simplified.

The drive potential applied to drive electrodes 20 may be may be a potential which reduces the liquid repellency of insulating layer 21 to the same level as lyophilic circular areas 25. Accordingly, the drive potential may be a positive potential greater than ground potential or a negative potential less than ground potential.

Figure 4:
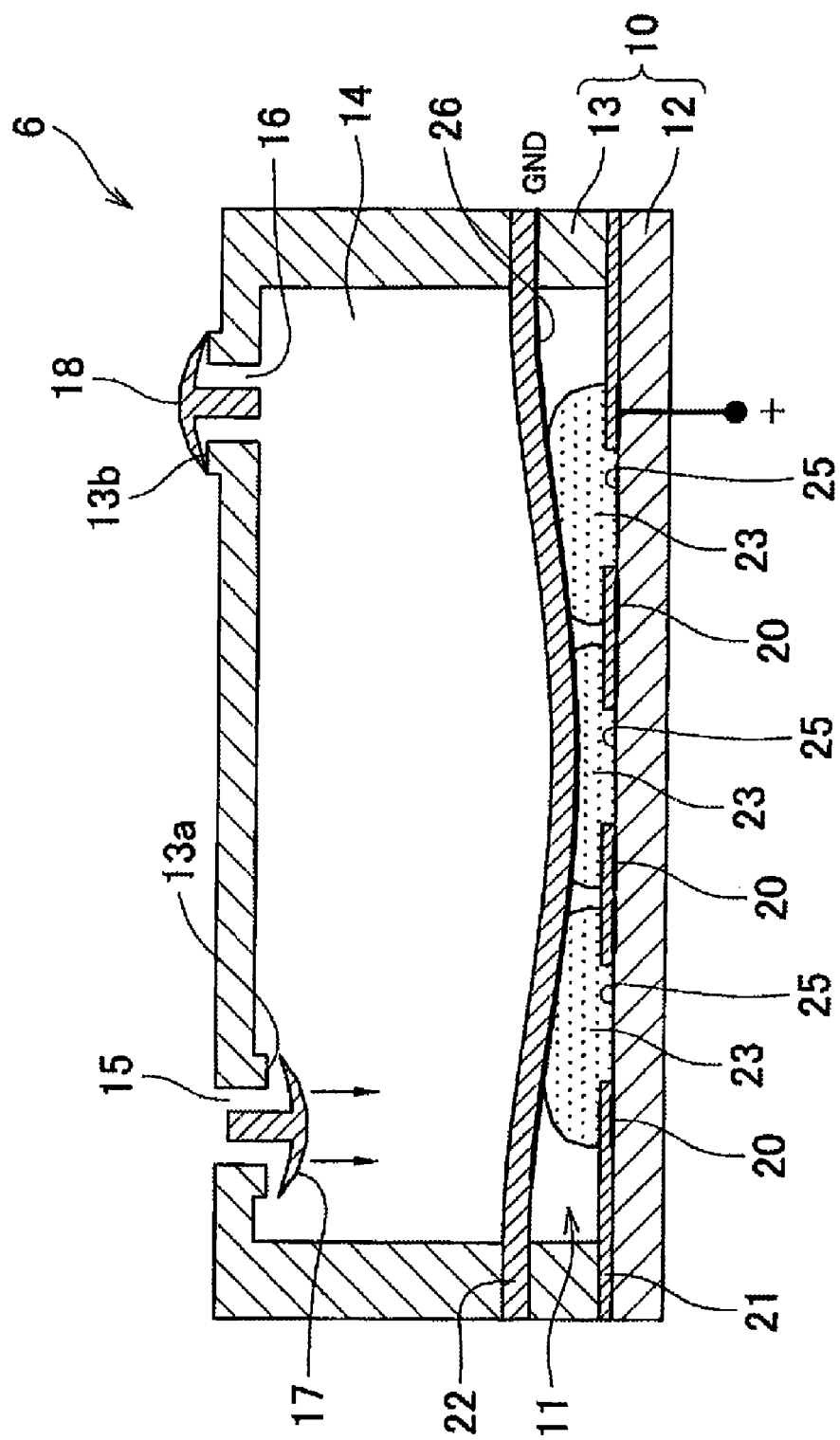
FIG. 4 is a vertical, sectional view of the pump of FIG. 2, when the pump draws air.

When the liquid repellency of areas of insulating layer 21 corresponding to drive electrodes 20 is reduced to the same level as those of circular areas 25, droplets 23 positioned on circular areas 25 may spread out over areas of insulating layer 21 corresponding to drive electrodes 20, as shown in FIG. 4. Accordingly, areas of droplets 23 contacting the upper surface of bottom plate 12 may increase and the height of droplets 23 may decrease. When the height of droplets 23 decreases, surface tension of droplets 23 is applied downward to a contact portion between droplets 23 and drive plate 22, such that the contact portion may move downward. Consequently, drive plate 22 deforms concavely which increases the volumetric capacity of air chamber 14.

Figure 5:
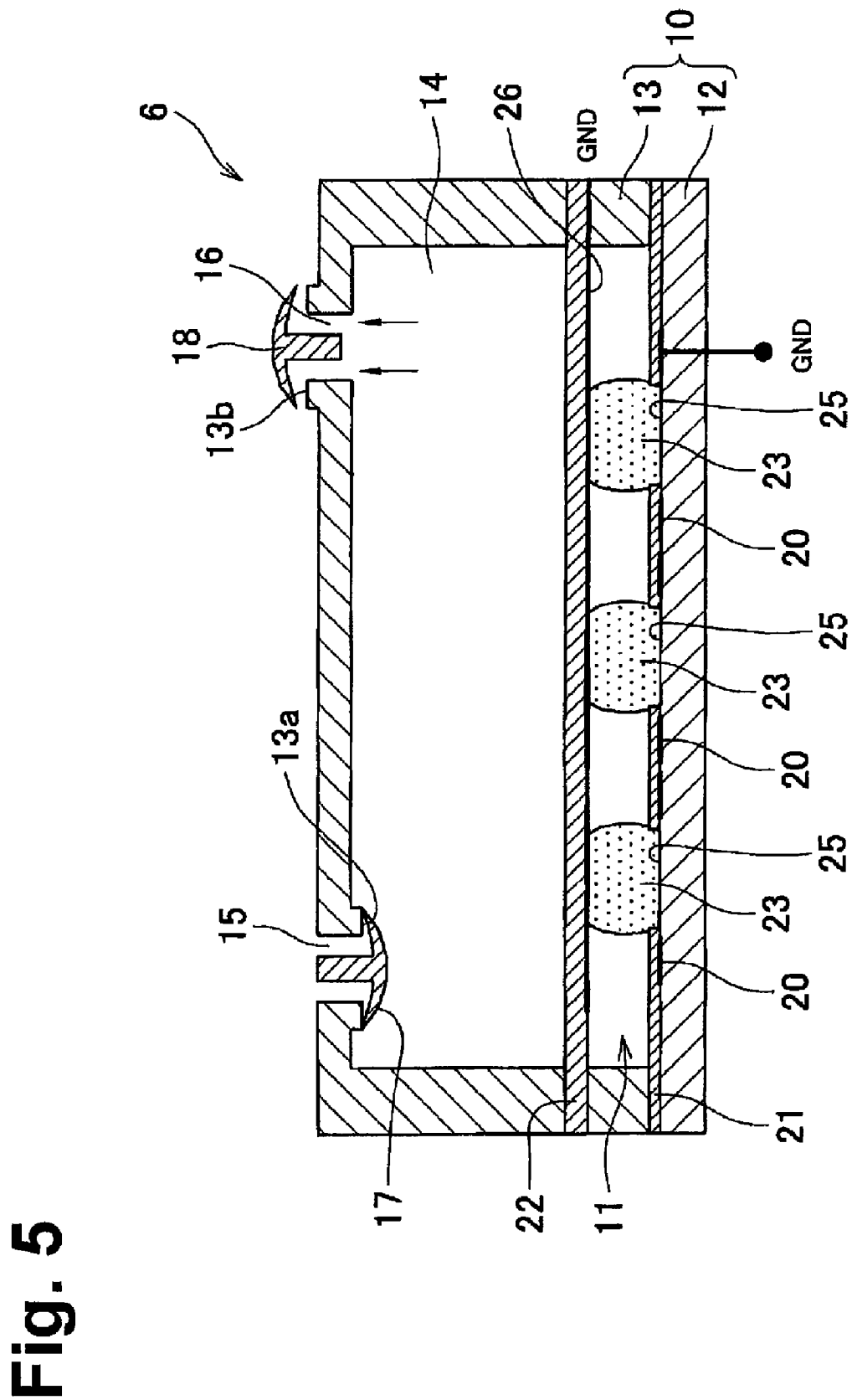
FIG. 5 is a vertical, sectional view of the pump of FIG. 2, when the pump discharges air.
Figure 6:
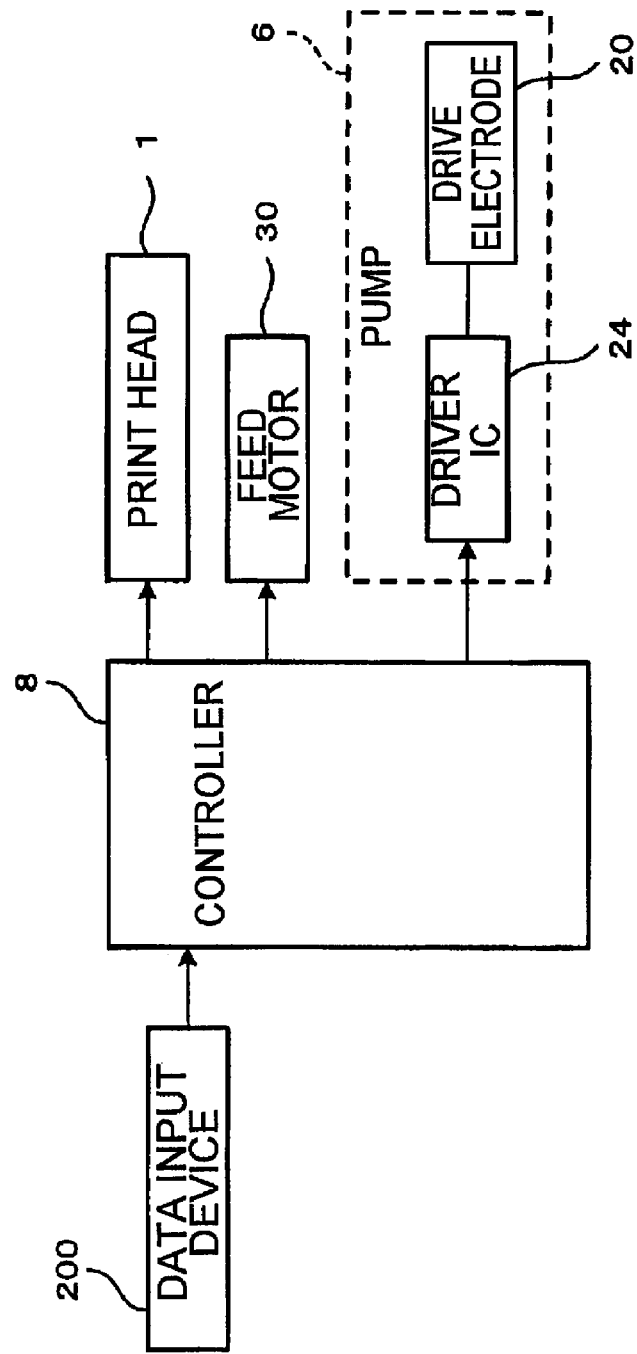
FIG. 6 is a block diagram of an electrical configuration of the inkjet printer of FIG. 1.

When the potential applied to drive electrodes 20 is altered from the drive potential to ground potential, no potential difference is applied between drive electrodes 20 and droplets 23, such that the liquid repellency of insulating layer 21 covering drive electrodes 20 returns to its original state and becomes greater than the liquid repellency of circular areas 25. Therefore, droplets 23 spreading out over areas of insulating layer 21 corresponding to drive electrodes 20, rest inside circular areas 25, as shown in FIG. 5, so as to reduce the contact area between droplet 23 and the upper surface of bottom plate 12. Accordingly, the height of droplet 23 increases, and the contact portion between drive plate 22 and droplets 23 deforms upward to place drive plate 22 back to the horizontal state and to reduce the volumetric capacity of air chamber 14.

To increase the volumetric capacity of air chamber 14, the drive potential may be applied to all drive electrodes 20 at the same time. To reduce the volumetric capacity of air chamber 14, ground potential may be applied to all drive electrodes 20 at the same time. Thus, the height of all droplets 23 may be selectively reduced or increased. All of the contact portions between droplets 23 and drive plate 22 may deform downward or upward at the same time. Therefore, the degree of deformation of drive plate 22, i.e., the change in volumetric capacity of air chamber 14, may be increased while the drive potential is maintained relatively low.

Even when the number of drive electrodes 20 positioned on the upper surface of bottom plate 12 is one drive electrode, and the number of droplets 23 is one droplet, drive plate 22 may be deformed with the changes of height of one droplet 23 by increasing an area of drive electrode 20 sufficiently and increasing the volume of droplet 23 corresponding to drive electrode 20 sufficiently enough to support drive plate 22 from below. Force due to surface tension of droplet 23 applied to a contact portion between drive plate 22 and droplet 23 is proportional to the length of a perimeter of the contact portion. Therefore, when drive electrode 20 positioned on the upper surface of bottom plate 12 is divided into a plurality of drive electrodes, and a plurality of droplets 23 are positioned in correspondence with drive electrodes 20, as shown in FIG. 3, the total length of perimeters of droplets 23 contacting drive plate 22 may be increased, as compared to when one droplet 23 is positioned in correspondence with one drive electrode 20. Thus, the force applied to drive plate 22 from a plurality of droplets 23 may be increased as much as possible to deform drive plate 22 while drive potential is maintained relatively low.

Lyophilic circular area 25 may be positioned adjacent to drive electrodes 20 at which wetting angle θ of droplets 23 changes in accordance with changes of potential applied to drive electrodes 20. Therefore, droplets 23 may not move freely on the upper surface of bottom plate 12 away from areas of corresponding drive electrodes 20, for example, when potential is changed. Thus, behavior of droplets 23 may be stabilized. Further, lyophilic circular area 25 of a ring shape with no cuts or breaks may be positioned inside drive electrode 20. Therefore, droplet 23 corresponding to one drive electrode 20 may not move to an area corresponding to adjacent other drive electrodes 20. Thus, stable operations of actuator 11 may be maintained.

Droplets 23 may contact common electrode 26 positioned on the lower surface of drive plate 22. Droplets 23 may be maintained at ground potential with common electrode 26. Therefore, fluctuations of potential difference between droplets 23 and drive electrodes 20 attributable to fluctuations of potential applied to droplet 23, may be prevented. Thus, actuator 11 may be activated reliably.

A controller 8 may control various operations of inkjet printer 100, such as ink ejection from print head 1, sheet feeding by feed roller 3, and back pressure adjustment by pump 6. Controller 8 may comprise a CPU (Central Processing Unit), a ROM (Read Only Memory) configured to store programs and data for controlling printer 100, and a RAM (Random Access Memory) configured to temporarily store data for processing by CPU.

Controller 8 controls print head 1 and a feed motor 30 configured to drive feed roller 3, to form an image on sheet P, based on image data input from a data input device 200, such as a personal computer. To prevent ink from leaking from the nozzles of print head 1 due to back pressure applied to ink passages to the nozzles when printing is not performed, controller 8 controls actuator 11 of pump 6 to discharge air in ink cartridge 4 using pump 6. Thus, inner pressure of ink cartridge 4 may be reduced.

Figure 2:
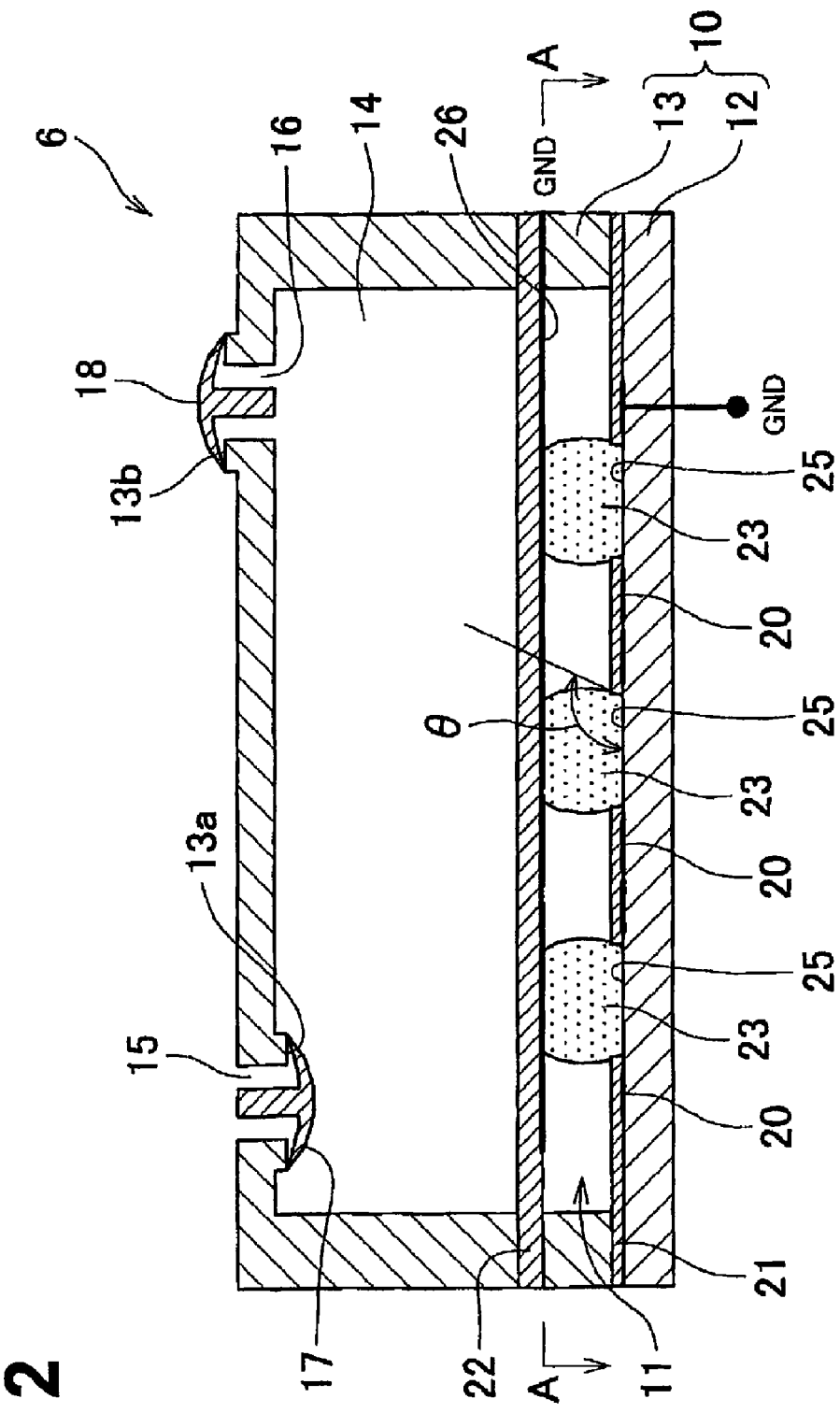
FIG. 2 is a vertical, sectional view of a pump of the inkjet printer of FIG. 1, in which the pump is not activated.

When controller 8 does not output a control signal for driving pump 6 to driver IC 24, driver IC 24 may maintain all drive electrodes 20 at ground potential, as shown in FIGS. 2 and 3. Because the potential difference is not applied between droplets 23 and corresponding drive electrodes 20, liquid repellency of insulating layer 21 may be greater than that of circular areas 25. Each droplet 23 is positioned on corresponding circular areas 25. In this state, drive plate 22 is substantially horizontal and parallel to the upper surface of bottom plate 12. Inlet and outlet valve members 17 and 18 are pressed against valve seats 13a and 13b, respectively, by the urging members and closes inlet 15 and outlet 16.

When controller 8 determines that the inner pressure of ink cartridge 4 (back pressure of ink passages) should be reduced, controller 8 outputs a control signal for driving pump 6 to driver IC 24 of actuator 11 of pump 6.

Controller 8 may determine that the inner pressure of ink cartridge 4 should be reduced, for example, when new ink cartridge 4 is installed in printer 100 or the inner pressure of ink cartridge 4 is expected to be increased due to air entry from inlet 15 or outlet 16 after the lapse of a predetermined amount of time from the last operation of pump 6. Controller 8 may be structured so as to determine whether pump 6 should be driven based on outputs from a detection device that may be positioned in printer 100 to detect the inner pressure of ink cartridge 4.

When controller 8 outputs a control signal to driver IC 24, driver IC 24 applies a drive potential to all drive electrodes 20 at the same time, as shown in FIG. 4. Then, the liquid repellency of insulating layer 21 at all areas corresponding to drive electrodes 20 is lowered at the same time. As a result, droplets 23 provided in correspondence with drive electrodes 20 reduce their heights. Therefore, a downward force is applied from droplets 23 to contact portions between droplets 23 and drive plate 22 to deform drive plate 22 concavely.

At this time, the volumetric capacity of air chamber 14 increases by the amount that drive plate 22 deforms, such that the pressure in air chamber 14 decreases. Therefore, due to pressure difference between air chamber 14 and ink cartridge 4, inlet valve member 17 is moved downward against the urging force of the urging member away from valve stat 13a to open inlet 15. Thus, air in ink cartridge 4 flows into air chamber 14 through inlet 15. Atmospheric pressure is greater than the inner pressure of air chamber 14, such that outlet 16 is closed by outlet valve member 18. Thus, entry (backflow) of the air through outlet 16 may be prevented.

After the lapse of a predetermined amount of time from an application of the drive potential to all drive electrodes 20, driver IC 24 may change the potential to be applied to all drive electrodes 20 to ground potential, as shown in FIG. 5. Then, all areas of insulating layer 21 corresponding to drive electrodes 20 have liquid repellency greater than that of circular areas 25. Therefore, droplets 23 corresponding to drive electrodes 20 returns to circular areas 25 from areas corresponding to drive electrodes 20 and increase their heights. Therefore, an upward force is applied from droplets 23 to contact portions between droplets 23 and drive plate 22 to place drive plate 22 in an original horizontal state.

At this time, the volumetric capacity of air chamber 14 is restored (reduced), and the pressure in air chamber 14 increases. Therefore, due to the pressure difference between air chamber 14 and atmospheric pressure, outlet valve member 18 is moved upward against the urging force of the urging member away from valve seat 13b to open outlet 16. Thus, air in air chamber 14 is discharged outside through outlet 16. The inner pressure of air chamber 14 is greater than that of ink cartridge 4, such that inlet 15 is closed by inlet valve member 17. Thus, flow (backflow) of air to ink cartridge 4 through inlet 15 may be prevented.

With the above-described operations of pump 6, air in ink cartridge 4 is discharged outside through air chamber 14, such that the inner pressure of ink cartridge 4 is reduced. The operation of pump 6 in accordance with the input of a control signal from controller 8 to driver IC 24 may be performed several times. The number of operations of pump 6 may be predetermined, or may be set by controller 8 to an appropriate times based on the inner pressure of ink cartridge 4.

An example of pump 6 according an embodiment of the present invention now will be described. In one example, the specification of pump body 10 and actuator 11 are as follows:
Air chamber: Inside diameter; 20 mm, Height; 3 mm
Drive plate: Material; polyimide, Thickness; 50 μm
Drive electrode: Inside diameter (Outside diameter of circular area); 0.3 mm, Outside diameter; 0.5 mm, Number of electrodes; 800
Distance between drive plate and insulating layer: 0.15 mm
Surface tension of droplet: 45 mN/m In a pump 6, when droplet 23 positioned on circular area 25 spreads out over an area of insulating layer 21 corresponding to drive electrode 20, the diameter of droplet 23 may be altered from 0.3 mm to 0.5 mm. At this time, the height of droplet 23 may altered from 0.15 mm to 0.05 mm. Drive plate 22 may deform about 0.1 mm. A single deformation of drive plate 22 may increase the volumetric capacity of air chamber 14 about 30 mm$^3$.

The total length of perimeters of spreading droplets 23 is obtained by; $0.5 \times 10^{-3}$ (diameter of droplets)$\times \pi \times 800$ (number of electrodes)=1.2 mm. Therefore, the force applied from droplets 23 to drive plate 22 by; 1.2 m (sum of lengths of spreading droplet perimeters)$\times$45 mN/m (surface tension of droplet)=$5.4 \times 10^{-2}$ N. Therefore, the pressure that occurs in air chamber 14 is; $5.4 \times 10^{-2}/((10 \times 10^{-3})^2 \times \pi)$=170 Pa. Accordingly, a single operation of pump 6 may cause subtle pressure changes of approx. 17 mmH$_2$O.

With pump 6 of this embodiment of the present invention, drive plate 22 may be deformed with the changes of droplet heights by altering wetting angle θ of droplets 23 with respect to insulating layer 21 using electrowetting. The subtle deformation of drive plate 22 enables subtle pressure changes in air chamber 14. Therefore, subtle adjustment of the back pressure in the ink passages of inkjet printer 100 may be made.

Drive plate 22 is deformed using electrowetting. Therefore, power consumption may be reduced as compared with a known piezoelectric actuator. Further, drive plate 22 may be deformed with a less complex structure by providing, for example, droplets 23 positioned between bottom plate 12 and drive plate 22 and drive electrodes 20 positioned between droplets 23 and the upper surface of bottom plate 12. The less complex structure may lead to the reduction in size of actuator 11, and in turn, reduction in the size of pump 6. Bottom plate 12 and drive plate 22 do not directly contact each other, such that noises caused by driving pump 6 may be reduced or substantially eliminated.

Figure 7:
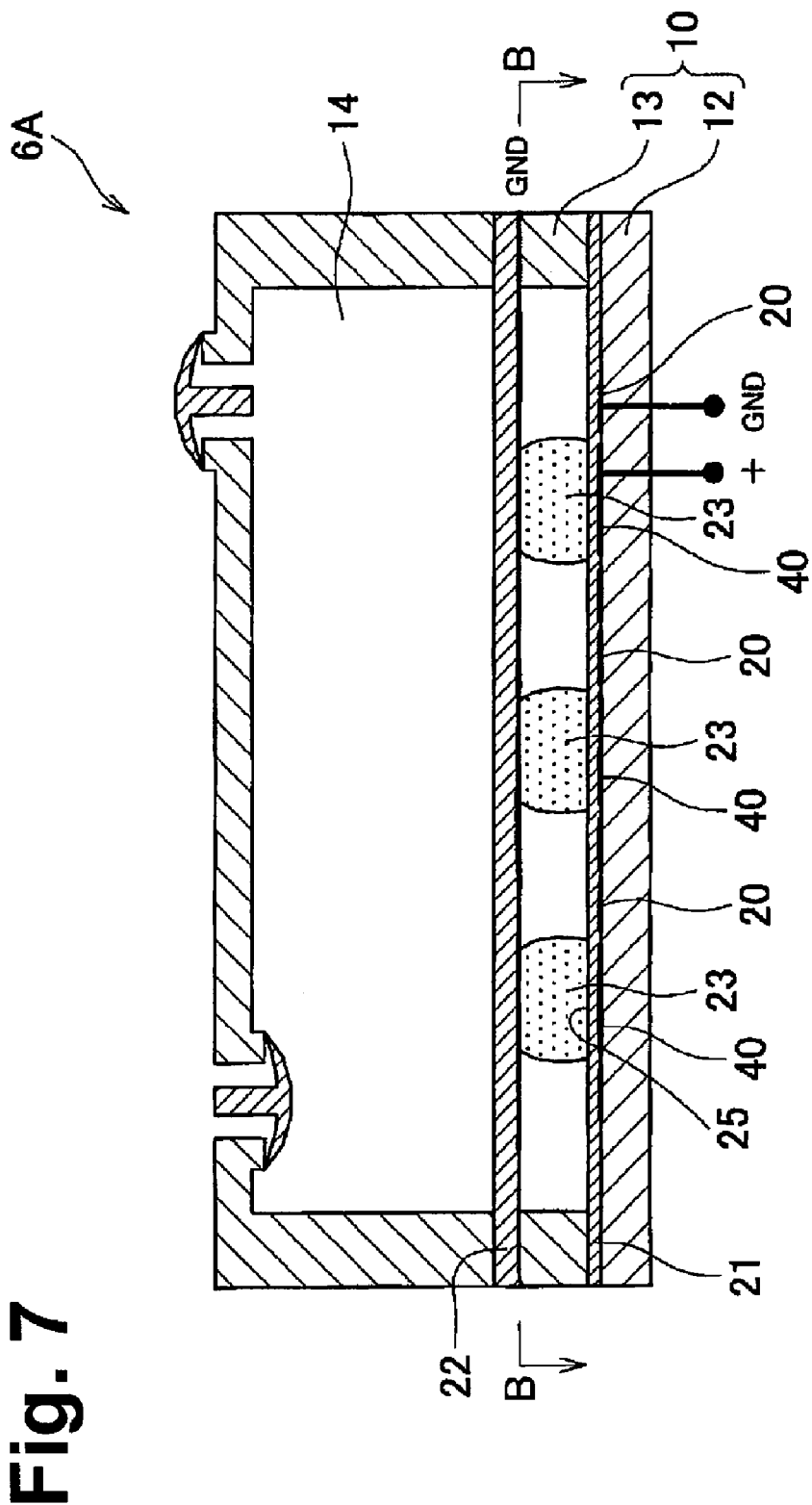
FIG. 7 is a vertical, sectional view of a pump, according to another embodiment of the present invention.
Figure 8:
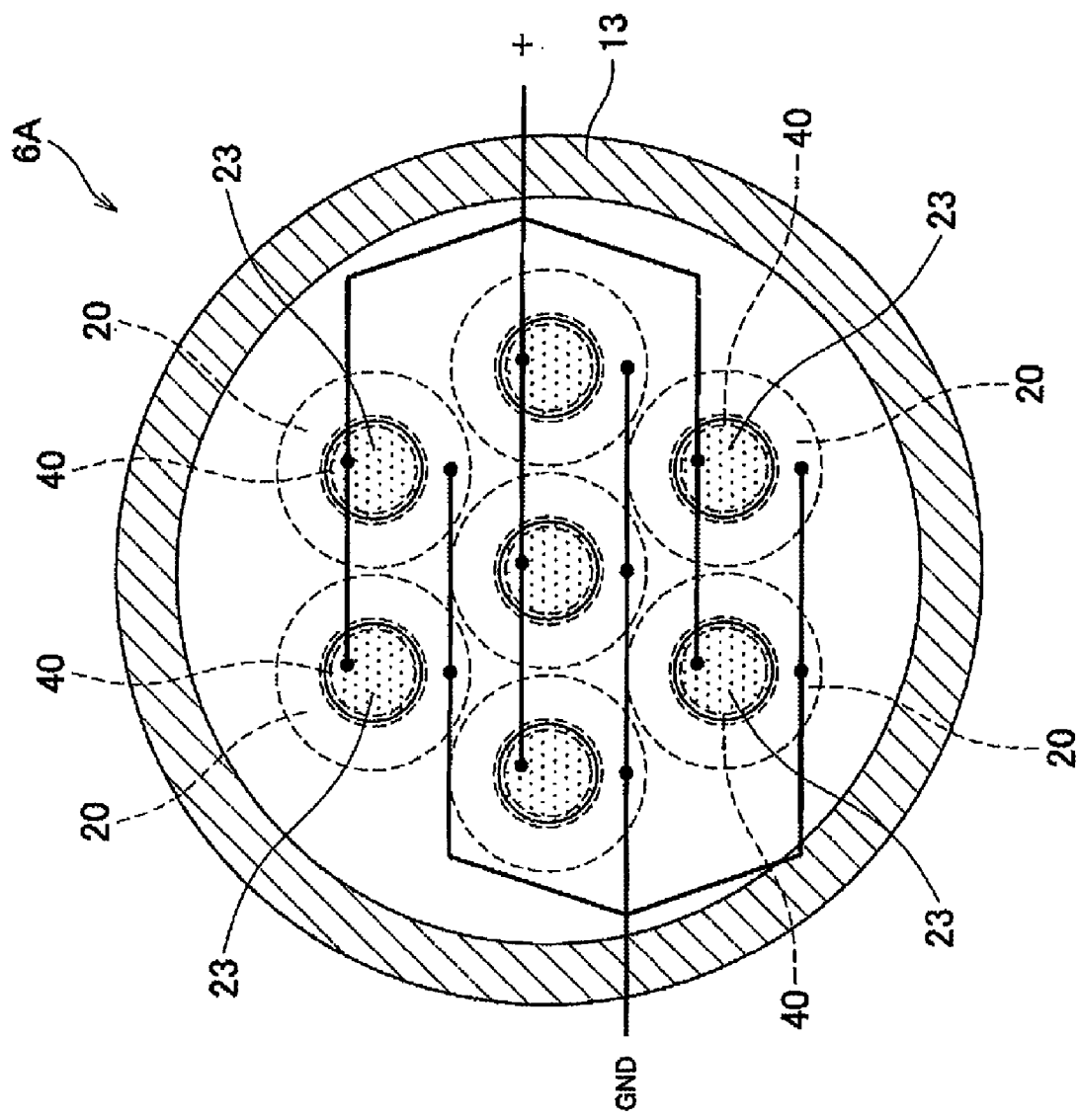
FIG. 8 is a horizontal, sectional view of the pump of FIG. 7, taken along a line B-B.
Figure 9:
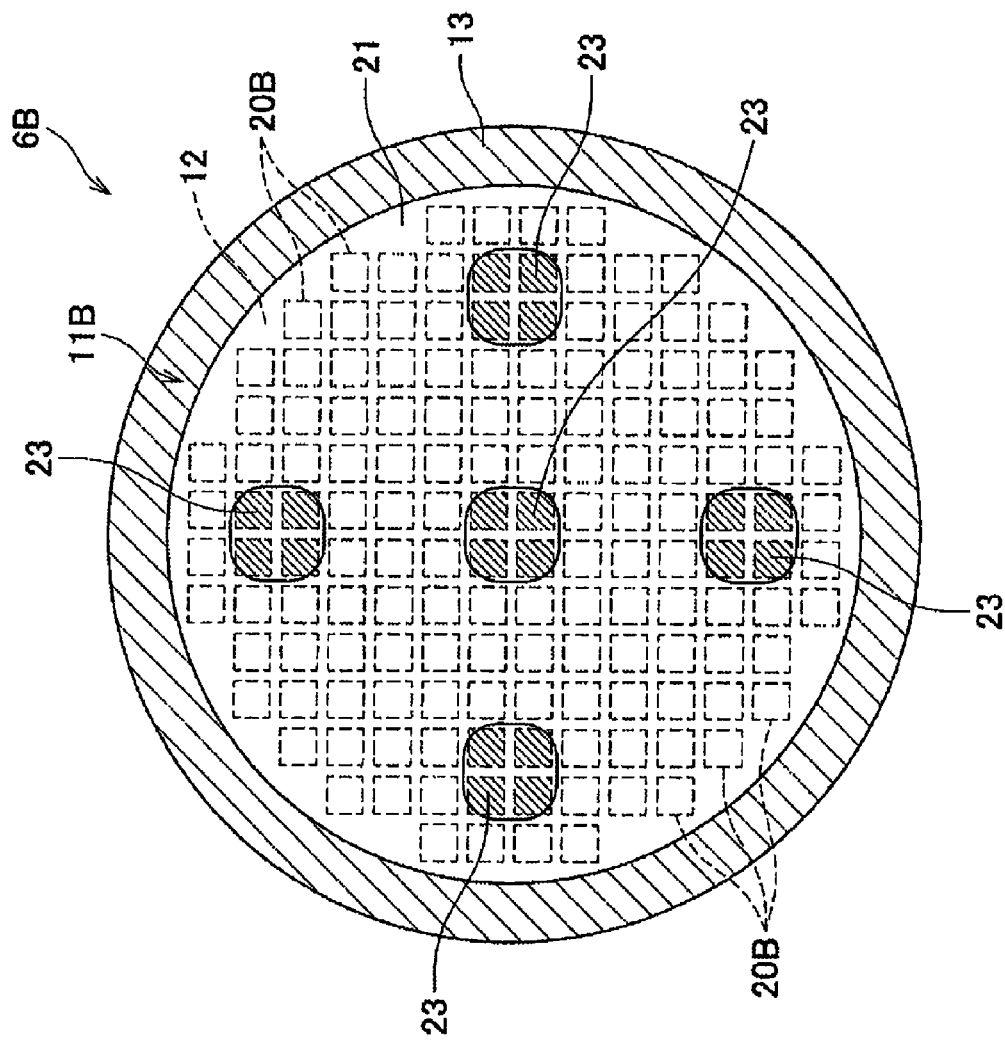
FIG. 9 is a horizontal, sectional view of a pump, according to still yet another embodiment of the present invention.

Referring to FIGS. 7-9, pumps 6A and 6B according other embodiments of the present invention are described. Pumps 6A and 6B may be similar to pump 6. Therefore, only those differences between pumps 6A and 6B and pump 6 are discussed with respect to pumps 6A and 6B.

Referring to FIGS. 7 and 8, in pump 6A, a circular electrode 40 may be positioned on circular area 25 inside drive electrode 20. Drive electrodes 20 and circular electrodes 40 may be covered with insulating layer 21. A potential equal to the drive potential may be continuously applied to circular electrodes 40 by driver IC 24. This enables wetting angle θ of droplets 23 with respect to insulating layer 21 to continuously decrease at corresponding circular areas 25. Moreover, circular areas 25 may become lyophilic, such that droplets 23 may be positioned on corresponding circular areas 25.

A potential opposite to the potential applied to drive electrodes 20 may be applied to circular electrodes 40 by driver IC 24. More specifically, when ground potential is applied to drive electrodes 20, the drive potential may be applied to circular electrodes 40. At this time, droplets 23 may be positioned only on corresponding circular areas 25, and droplets 23 may be relatively high. When the drive potential is applied to drive electrodes 20, ground potential may be applied to circular electrodes 40. At this time, droplets 23 may be positioned only on corresponding drive electrodes 20. If areas of ring-shaped drive electrodes 20 are greater than the areas of circular electrodes 40, the areas of droplets 23 contacting insulating layer 21 increase, such that heights of droplets 23 may decrease. Thus, drive plate 22 may be deformed with changes in the heights of droplets 23.

Referring to FIG. 9, in another embodiment of the present invention, pump 6B may comprise an actuator 11B, and drive electrodes 20B may have a square shape and may be positioned on the upper surface of bottom plate 12 along two directions perpendicular to each other, with an equal distance between adjacent drive electrodes 20B. In this embodiment, driver IC 24 may selectively apply the drive or ground potential to each of drive electrodes 20B. Insulating layer 21 that covers drive electrodes 20B may be provided on a whole area of the upper surface of bottom plate 12. Droplets 23, e.g., five droplets, contact a surface of insulating layer 21.

The number of drive electrodes 20B to which the same potential is applied by driver IC 24 with respect to one droplet 23 may be altered based on a control signal output from controller 8. More specifically, driver IC 24 may apply the drive potential to four drive electrodes 20B adjacent to each other, as indicated by the cross-hatching in FIG. 9, with respect to one droplet 23. The number of drive electrodes 20B to which the drive potential is applied with respect to one droplet 23 may be any number of drive electrodes 20B. Thus, an area where droplet 23 applies a liquid to insulating layer 21 may be altered. With such a structure, the heights of droplets 23 may be altered gradually or subtly, such that degree of deformation of drive plate 22, i.e., changes in the volumetric capacity of air chamber 14, may be adjusted finely.

Moreover, the potential applied to drive electrodes 20 from driver IC 24 is not limited to two potentials. When three or more potentials are used, wetting angle θ of droplets 23 with respect to areas of insulating layer 21 corresponding to drive electrodes 20 may be altered in three or more steps.

In addition, droplets 23 may directly contact corresponding drive electrodes 20 without providing insulating layer 21. When insulating layer 21 is not provided, application of drive potential to drive electrodes 20 may cause electrowetting so as to reduce wetting angle θ of droplet 23 with respect to a surface of drive electrode 20. Therefore, drive plate 22 still may be deformed with changes of droplet heights.

Figure 10A:
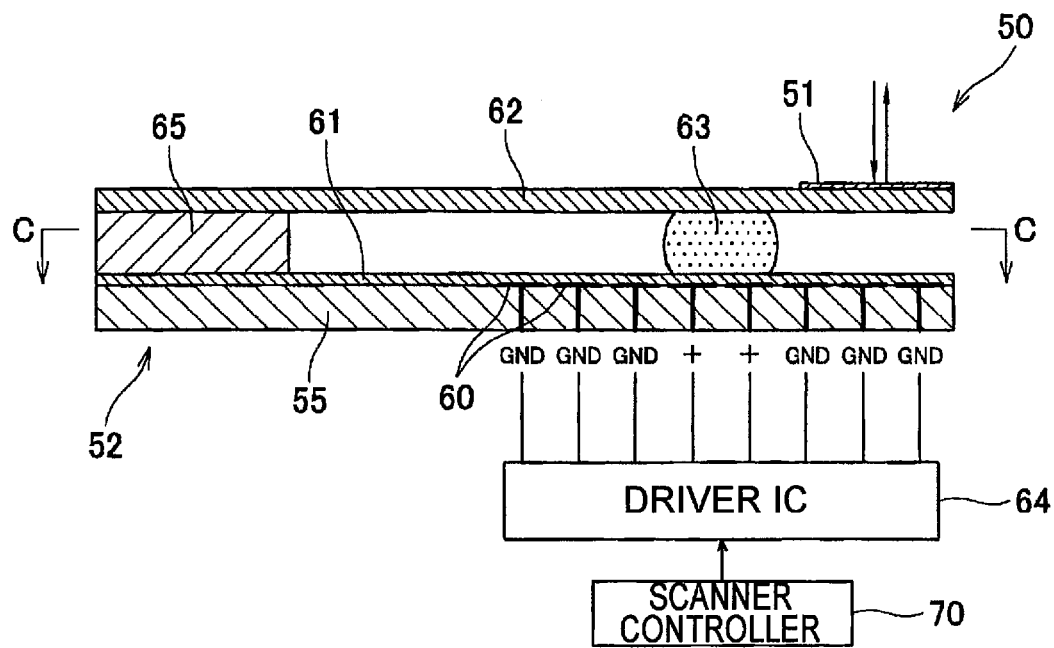
FIG. 10A is a vertical, sectional view of an optical scanner in a first state, according to an embodiment of the present invention.
Figure 10B:
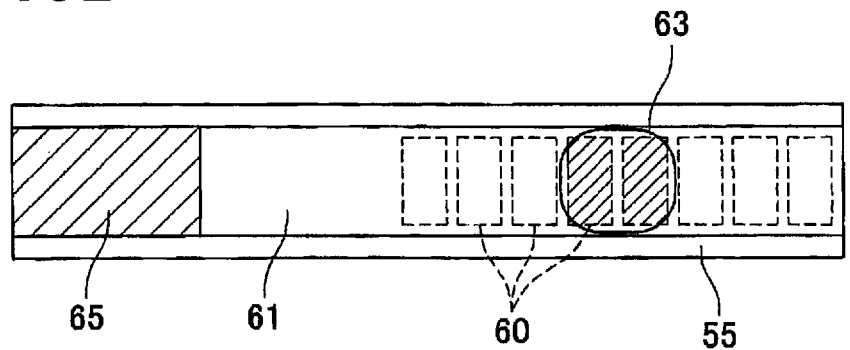
FIG. 10B is a horizontal, sectional view of the optical scanner of FIG. 10A, taken along a line C-C.

Referring to FIGS. 10A and 10B, an optical scanner 50 may comprise a light reflecting portion 51 configured to reflect incident light, and an actuator 52 configured to alter an inclination angle of light reflecting portion 51. The angle of inclination of light reflecting portion 51 may be altered in order to alter a reflecting direction of incident light and to deflect the light in a predetermined direction.

Actuator 52 also may comprise a substrate 55 which may be insulated at least on an upper surface thereof, a plurality of drive electrodes 60 positioned on the upper surface of substrate 55, an insulating layer 61 positioned on the upper surface of substrate 55 to cover drive electrodes 60, a drive plate 62 opposing and separated from insulating layer 61, a conductive liquid droplet 63 positioned between the insulating layer 61 and drive plate 62, and, a potential application device, e.g., a driver IC 64 configured to apply potential to drive electrodes 60.

Substrate 55 may be a rectangular plate member. Substrate 55 may comprise a synthetic resin material, such as polyimide, silicone, or metal. Drive electrodes 60 may be positioned on an upper surface of substrate 55, such that the upper surface of substrate 55 should be an insulating surface or should be treated to have an insulation property.

At least one drive electrode, such as a plurality of drive electrodes 60, e.g., eight drive electrodes, may have a rectangular shape and may be positioned on an end of the upper surface of insulating substrate 55 in its longitudinal direction. Drive electrodes 60 may be positioned equidistantly along a longitudinal direction of substrate 55. A wiring pattern may be drawn from each drive electrode 60 to a lower surface of substrate 55, and drive electrodes 60 may be connected to driver IC 64 via the wiring patterns. Insulating layer 61 may be positioned on the upper surface of substrate 55 to cover drive electrodes 60, and insulating layer 61 may comprise a synthetic resin material containing a fluorine-based resin.

Drive plate 62 may be a rectangular plate member having substantially the same planar shape as substrate 55. Light reflecting portion 51 may be configured to reflect light incident from above, and may be attached to a free end of the upper surface of drive plate 62. A base end of drive plate 62 opposite to its free end may be fixed to a support member 65 attached to the upper surface of substrate 55. Drive plate 62 may be fixed to substrate 55 via support member 65, and may oppose insulating layer 61. Drive plate 62 may comprise a material which is flexible enough to allow drive plate 62 to deform, but rigid enough to allow drive plate 62 to readily and quickly alter the inclination angle of light reflecting portion 51. For example, drive plate 62 may comprise silicone.

Conductive droplet 63 may be positioned between insulating layer 61 and drive plate 62. A common electrode (not shown) may be positioned on the lower surface of drive plate 62. Droplet 63 may be maintained at ground potential via the common electrode.

Driver IC 64 applies the drive potential or ground potential to drive electrodes 60 based on a control signal output from a scanner controller 70 which controls optical scanner 50.

Wetting angle θ of droplet 63 with respect to insulating layer 61 may be altered when the potential applied to drive electrodes 60 is altered. Changes in the liquid repellency of insulating layer 61 may cause the height of droplet 63 to be altered or may cause droplet 63 to move on insulating layer 61, which may cause drive plate 63 to deform. Moreover, movement of drive plate 62 at its free end may alter an angle of inclination of light reflecting portion 51 attached to the end of drive plate 62. Thus, the reflecting direction of incident light in which the light is reflected off a surface of light reflecting portion 51 may be altered.

Scanner controller 70 may comprise a CPU (Central Processing Unit), a ROM (Read Only Memory) configured to store programs and data for controlling optical scanner 50, and a RAM (Random Access Memory) configured to temporarily store data for processing by CPU. Scanner controller 70 may adjust an angle of inclination of light reflecting portion 51 to reflect incident light in a predetermined deflecting direction, while controlling driver IC 64 of actuator 52.

When it is desirable to alter the deflecting direction of incident light, scanner controller 70 outputs a control signal to driver IC 64 to alter the potential applied to a portion of the plurality of drive electrodes 60.

For example, scanner controller 70 may control driver IC 64 to alter the number of drive electrodes 60 to which the drive potential is applied. As the height of droplet 63 is altered, the free end of drive plate 62 may move, and consequently, the reflecting direction of incident light may be altered.

For example, in FIGS. 10A and 10B, the drive potential may be applied to two drive electrodes 60, as shown by hatching in FIG. 10B, that are positioned substantially in the middle of drive electrodes 60 arranged in a row, and ground potential may be applied to other drive electrodes 60. The liquid repellency of insulating layer 61 may be locally reduced at an area corresponding to the two drive electrodes 60 to which the drive potential is applied. Therefore, droplet 63 spreads over insulating layer 61 at the area corresponding to the two drive electrodes 60. At this time, drive plate 62 may be substantially horizontal and parallel to the upper surface of substrate 55. Therefore, when light is incident from above toward light reflecting portion 51, the light is reflected upward.

Figure 11A:
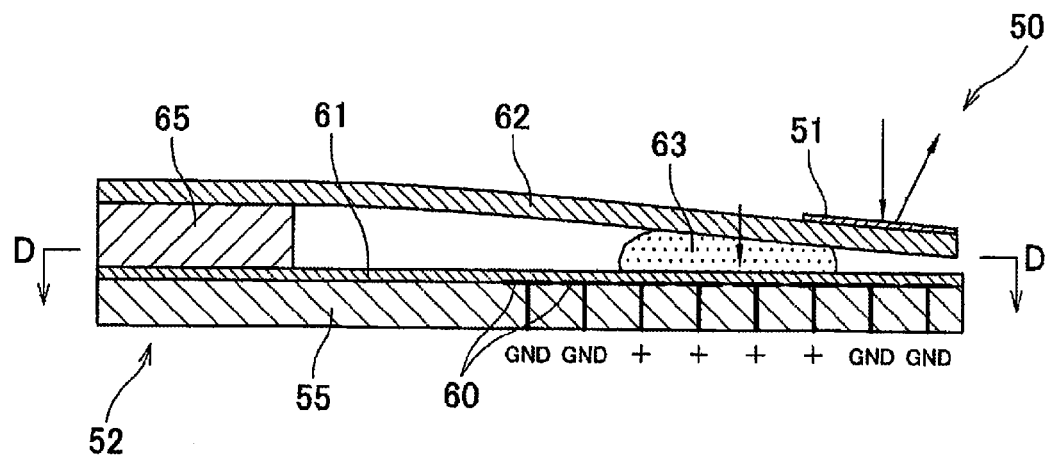
FIG. 11A is a vertical, sectional view of the optical scanner of FIG. 10A showing a height of a droplet decreases from that shown in FIG. 10A.
Figure 11B:
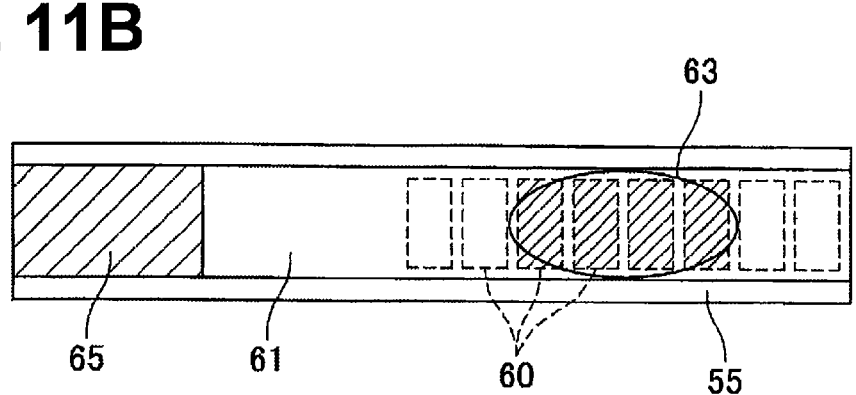
FIG. 11B is a horizontal, sectional view of the optical scanner of FIG. 11A, taken along a line D-D.

As shown in FIG. 11A, when the drive potential also is applied to the drive electrodes 60 which are adjacent to the two drive electrodes 60 positioned substantially in the middle, an area of insulating layer 61 at which the liquid repellency is reduced may expand toward each of the adjacent electrodes, such that droplets 63 spread out over an area of insulating layer 61 corresponding to the four drive electrodes 60 to which the drive potential is applied. Thus, the contact area between droplet 63 and insulating layer 61 increases, and the height of droplet 63 is reduced. Moreover, a downward force is applied to a contact portion between drive plate 62 and droplet 63, such that drive plate 62 deforms. Consequently, the free end of drive plate 62 moves downward, and incident light is reflected toward a right-upward direction in FIG. 11A.

Scanner controller 70 may control driver IC 64 to selectively alter the drive electrodes 60 to which the drive potential is applied. Thus, droplet 63 may move along the upper surface of substrate 55 to move the free end of drive plate 62, and the reflecting direction of incident light may be altered.

The downward force applied to drive plate 22 by the surface tension of droplet 63 may not be significantly altered when at least one of the drive electrodes 60 to which the drive potential is applied is switched to another drive electrode 60, so long as the number of drive electrodes 60 to which the drive potential is applied remains unaltered. Nevertheless, the base end of drive plate 62 may be fixed to substrate 55. Therefore, although the downward force applied by droplet 63 upon drive plate 62 may remain constant so long as the number of drive electrodes 60 to which the drive potential is applied remains constant, the amount which drive plate 62 bends may increase as the contact portion between droplet 63 and drive plate 62 moves away from the fixed base end of drive plate 62 and closer to the free end of drive plate 62. Thus, by altering the drive electrodes 60 to which the drive potential is applied, droplet 63 may move on insulating layer 61 along arrangement direction of drive electrodes 60, and the free end of drive plate 62 may bend to alter the angle of inclination of light reflecting portion 51.

Figure 12A:
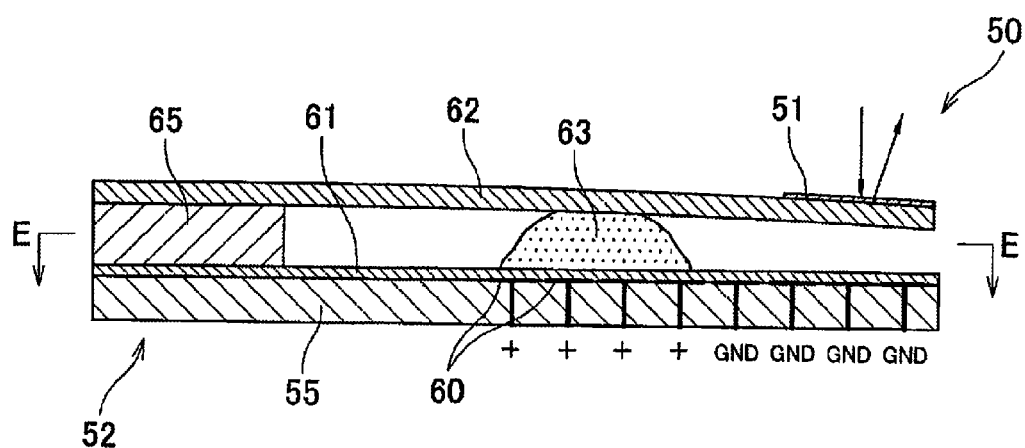
FIG. 12A is a vertical, sectional view of the optical scanner of FIG. 10A in a second state.
Figure 12B:
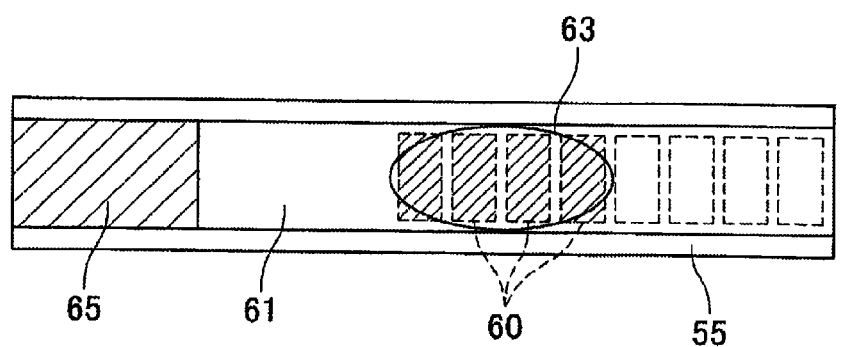
FIG. 12B is a horizontal, sectional view of the optical scanner of FIG. 12A, taken along a line E-E.
Figure 13A:
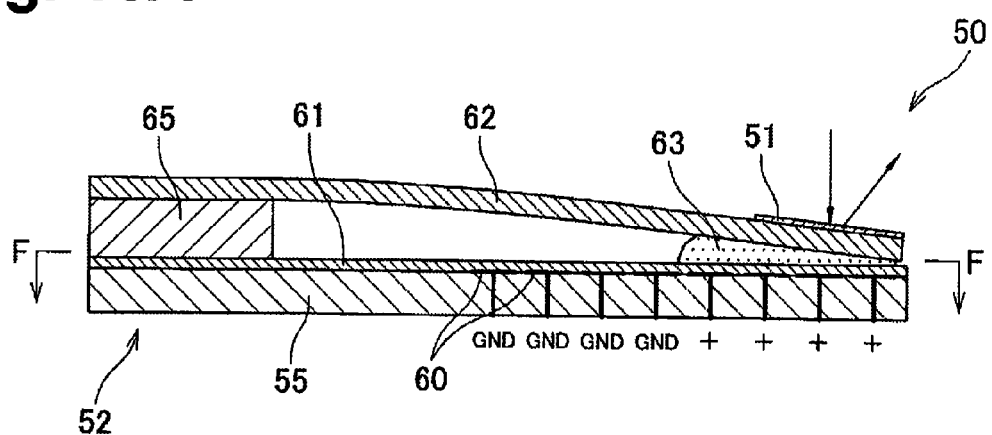
FIG. 13A is a vertical, sectional view of the optical scanner of FIG. 10A, showing a droplet shifted to an end from a state shown in FIG. 12A.
Figure 13B:
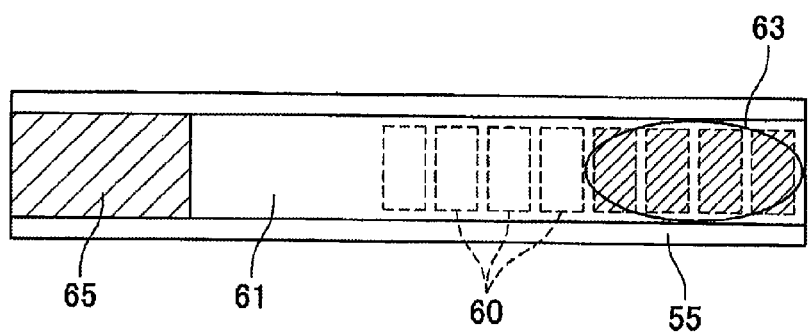
FIG. 13B is a horizontal, sectional view of the optical scanner of FIG. 13A, taken along a line F-F.

For example, as shown in FIGS. 12A and 12B, the drive potential may be applied by driver IC 64 to a portion of the drive electrodes 60, e.g., four drive electrodes 60, positioned on a side of the base end of drive plate 62, e.g., the four electrodes 60 on left side in FIGS. 12A and 12B, and ground potential may be applied to other drive electrodes 60, e.g., the electrodes 60 positioned on the free end side of drive plate 62. Droplet 63 then may spread over the portion of insulating layer 61 corresponding to the plurality of drive electrodes 60, e.g., four electrodes, positioned on the base end side of the drive plate 62.

In FIGS. 12A and 12B, when driver IC 64 switches the drive electrodes 60 to which the potential is applied from the plurality of electrodes positioned on the base end side of drive plate 62 to the plurality of drive electrodes positioned on the free end side of drive plate 62, droplet 63 which initially is positioned on the base end side of drive plate 62 moves to the free end side of drive plate 62.

If the potential applied to all of drive electrodes 60 is simultaneously altered, the behavior of droplet 63 may become unstable. Therefore, the drive electrodes 60 to which the drive potential is applied may be sequentially shifted to the next drive electrode 60 in a position corresponding to the free end of drive plate 62, without altering the number of drive electrodes 60 to which dive potential is applied, e.g., when the drive potential is applied to the next drive electrode 60, ground potential is applied to the drive electrode 60 which is positioned closest to the base end side of drive plate 62 and currently receives the drive potential. For example, in FIG. 12A, there are eight drive electrodes 60, and the potential of the fifth drive electrode 60 from the base end of drive plate 62 may be altered from ground potential to drive potential, and the potential of the first drive electrode 60 positioned closest to the base end of drive plate 62 may be altered from drive potential to ground potential. Consequently, an area of insulating layer 61 in which the liquid repellency is reduced may be shifted by one drive electrode 60 toward the free end of drive plate 62, and droplet 63 may move toward the free end of drive plate 62. This process may continue until the potential applied to each of the drive electrodes 62 is switched, i.e., from the drive potential to ground potential, or vice versa.

Moreover, scanner controller 70 may control driver IC 64 to alter both the number of electrodes to which the drive potential is applied, and the location of those electrodes to which the drive potential is applied, to more precisely adjust the amount by which drive plate 62 is deformed, e.g., the amount by which the reflecting direction is altered.

In addition, scanner controller 70 may control driver IC 64 to alter the drive potential applied to drive electrodes 60 based on the resonance frequency of drive plate 62 to resonate drive plate 62, which may increase the deformation of drive plate 62.

In an exemplary embodiment of the present invention, actuator 52 may have the following specifications:
Drive plate: Material; silicone, Length; 500 μm, Width; 30 μm, Thickness; 10 μm.
Surface tension of droplet: 45 mN/m.

For example, when the diameter of an area at which droplet 63 contacts the lower surface of drive plate 62 is 30 μm, the total length of perimeters of droplets 63 may be obtained by; $30 \times 10^{-6} \times \pi = 9.4 \times 10^{-5}$ m. Therefore, the downward force F applied to drive plate 62 by the surface tension of droplets 63 may be obtained by; $F = 9.4 \times 10^{-5}$ m $\times 45 \times 10^{-3}$ N/m (surface tension of droplet)=$4.2 \times 10^{-6}$ N=0.43 mg.

Drive plate 62 may be fixed at one end and may be cantilevered. When force F is applied to the free end of drive plate 62, the amount of deformation of the free end may be obtained by: $\delta = Fl^3/3EI = Fl^3/3E(bh^3/12) = ((0.43 \times 10^{-6}) \times (500 \times 10^{-3})^3)/(3 \times 7200 \times (30 \times 10^{-3}) \times (10 \times 10^{-3})^3/12) = 1 \times 10^{-3}$ mm=1.0 μm where E=elastic coefficient of silicone drive plate 62. Thus, the free end of drive plate 62 at which light reflecting portion 51 is positioned may be deformed by 1 μm.

In optical scanner 50, wetting angle θ of droplet 63 with respect to insulating layer 61 may be altered using electrowetting to change the height of droplet 63. Alternatively, droplet 63 may be moved along insulating layer 61 to deform drive plate 62. Thus, light reflecting portion 51 positioned on drive plate 62 may be subtly and precisely moved. Consequently, the reflecting direction of the incident light may be subtly and precisely adjusted to a predetermined deflecting direction. Further, the amount of power consumed by actuator 52 may be reduced relative to a known actuator, and the size of actuator 52 and optical scanner 50 may be reduced relative to a known actuator and optical scanner, respectively.

While the invention has been described in connection with various example structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. An actuator comprising:
   a substrate comprising an insulating surface;
   a first electrode positioned on the insulating surface;
   a flexible drive plate which opposes the insulating surface;
   a conductive liquid positioned between the insulating surface and the flexible drive plate, wherein the conductive liquid directly or indirectly contacts the insulating surface and the flexible drive surface; and
   a potential application device electrically coupled to the first electrode and configured to apply a potential to the first electrode.

2. The actuator of claim 1, wherein when the potential application device alters the potential applied to the first electrode, the flexible plate deforms.

3. The actuator of claim 1, wherein when the potential application device alters the potential applied to the first electrode, a wetting angle of the conducting liquid with respect to the insulating surface and a height of the conductive liquid relative to the insulating surface are altered, which deforms the flexible drive plate, which alters a distance between the flexible drive plate and the insulating surface.

4. The actuator of claim 1, further comprising an insulating layer positioned on the insulating surface to cover the first electrode, wherein the conductive liquid contacts the insulating layer and the flexible drive plate.

5. The actuator of claim 1, further comprising a second electrode positioned on a surface of the flexible drive plate facing the insulating surface, wherein the second electrode continuously contacts the conductive liquid, and is maintained at a constant potential.

6. The actuator of claim 3, further comprising a lyophilic area positioned on the insulating surface adjacent to the first electrode, wherein the wetting angle of the conductive liquid with respect to the lyophilic area is less than or equal to the wetting angle of the conductive liquid with respect to an area of the insulating surface corresponding to the first electrode.

7. The actuator of claim 6, wherein the first electrode is ring-shaped with no breaks, and the lyophilic area is positioned inside the first electrode.

8. The actuator of claim 1, wherein the first electrode comprises a plurality of first electrodes positioned on the insulating surface.

9. The actuator of claim 8, wherein the conductive liquid is positioned in correspondence with each of the plurality of first electrodes between the insulating surface and the flexible drive plate, and the potential application device simultaneously applies the same potential to each of the plurality of first electrodes.

10. The actuator of claim 8, wherein the potential application device is configured to apply a first potential to at least one of the plurality of first electrodes and a second potential to others of the plurality of electrodes, wherein the first potential is different than the second potential.

11. The actuator of claim 9, wherein the potential application device is configured to sequentially alter the potential applied to the plurality of first electrodes, which moves the conductive liquid along the insulating surface.

12. The actuator of claim 1, wherein the potential application device is configured to sequentially alter the potential applied to the first electrode, which moves the conductive liquid along the insulating surface, which deforms the flexible drive plate.

13. The actuator of claim 10, wherein the potential application device is configured to alter a number of the plurality of first electrodes to which the first potential is applied and a number of the plurality of first electrodes to which the second potential is applied, which alters the height of the liquid droplet.

14. A pump, comprising:
a fluid chamber configured to store fluid therein;
a pump body having an inlet and an outlet formed therethrough, wherein each of the inlet and the outlet are configured to be in fluid communication with the fluid chamber; and
an actuator configured to alter a volumetric capacity of the fluid chamber, wherein the actuator comprises:
a substrate comprising an insulating surface;
a first electrode positioned on the insulating surface;
a flexible drive plate which opposes the insulating surface;
a conductive liquid positioned between the insulating surface and the flexible drive plate, wherein the conductive liquid directly or indirectly contacts the insulating surface and the flexible drive surface; and
a potential application device electrically coupled to the first electrode and configured to apply a potential to the first electrode.

15. The pump of claim 14, wherein when the potential application device alters the potential applied to the first electrode, the flexible plate deforms.

16. The pump of claim 14, wherein when the potential application device alters the potential applied to the first electrode, a wetting angle of the conducting liquid with respect to the insulating surface and a height of the conductive liquid relative to the insulating surface are altered, which deforms the flexible drive plate, which alters a distance between the flexible drive plate and the insulating surface, which alters the volumetric capacity of the fluid chamber.

17. The pump of claim 14, further comprising a valve configured to selectively open and close the inlet and the outlet based on a pressure of the fluid in the fluid chamber.

18. An optical scanner, comprising:
a light reflecting portion; and
an actuator configured to alter an inclination angle of the light reflecting portion, wherein the actuator comprises:
a substrate comprising an insulating surface;
a first electrode positioned on the insulating surface;
a flexible drive plate which opposes the insulating surface;
a conductive liquid positioned between the insulating surface and the flexible drive plate, wherein the conductive liquid directly or indirectly contacts the insulating surface and the flexible drive surface; and
a potential application device electrically coupled to the first electrode and configured to apply a potential to the first electrode.

19. The optical scanner of claim 18, wherein when the potential application device alters the potential applied to the first electrode, the flexible plate deforms.

20. The optical scanner of claim 18, wherein when the potential application device alters the potential applied to the first electrode, a wetting angle of the conducting liquid with respect to the insulating surface and a height of the conductive liquid relative to the insulating surface are altered, which deforms the flexible drive plate, which alters a distance between the flexible drive plate and the insulating surface, which alters the inclination angle of the light reflecting portion.

21. The optical scanner of claim 18, wherein the first electrode comprises a plurality of first electrodes positioned on the insulating surface.

22. The optical scanner of claim 21, wherein the potential application device is configured to apply a first potential to at least one of the plurality of first electrodes and a second potential to others of the plurality of electrodes, wherein the first potential is different than the second potential.

23. The optical scanner of claim 22, wherein the potential application device is configured to sequentially alter the potential applied to the plurality of first electrodes, which moves the conductive liquid along the insulating surface.

* * * * *